United States Patent
Huang

(10) Patent No.: US 8,247,991 B2
(45) Date of Patent: Aug. 21, 2012

(54) LIGHTING DELAY CIRCUIT

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 357 days.

(21) Appl. No.: 12/701,710

(22) Filed: Feb. 8, 2010

(65) Prior Publication Data
US 2011/0095699 A1    Apr. 28, 2011

(30) Foreign Application Priority Data
Oct. 22, 2009   (CN) .......................... 2009 1 0308645

(51) Int. Cl.
*H05B 37/02*   (2006.01)

(52) U.S. Cl. ........................ 315/291; 315/86; 315/309

(58) Field of Classification Search .................... 315/86, 315/112, 291, 294, 307–309; 361/83, 90, 361/106, 160, 165
See application file for complete search history.

(56) References Cited

U.S. PATENT DOCUMENTS

| | | | | |
|---|---|---|---|---|
| 4,155,032 A | * | 5/1979 | Schlick et al. | 315/307 |
| 5,004,953 A | * | 4/1991 | McDonald | 315/86 |
| 5,962,978 A | * | 10/1999 | Lee | 315/8 |
| 5,973,898 A | * | 10/1999 | Merchant et al. | 361/56 |
| 6,107,744 A | * | 8/2000 | Bavaro et al. | 315/86 |
| 6,987,363 B1 | * | 1/2006 | Goral | 315/86 |
| 2007/0257625 A1 | * | 11/2007 | Brison | 315/291 |
| 2008/0061713 A1 | * | 3/2008 | Zeng | 315/291 |

* cited by examiner

*Primary Examiner* — Tung X Le
(74) *Attorney, Agent, or Firm* — Altis Law Group, Inc.

(57) ABSTRACT

The lighting delay circuit can keep a light being on for a predetermined time then turn off the light. The circuit comprises a thermistor to sense temperature around the light when the light is on, an electronic switch controlled by the thermistor, and a relay controlled by the electronic switch to turn off the light when the electronic switch is turned on.

7 Claims, 1 Drawing Sheet

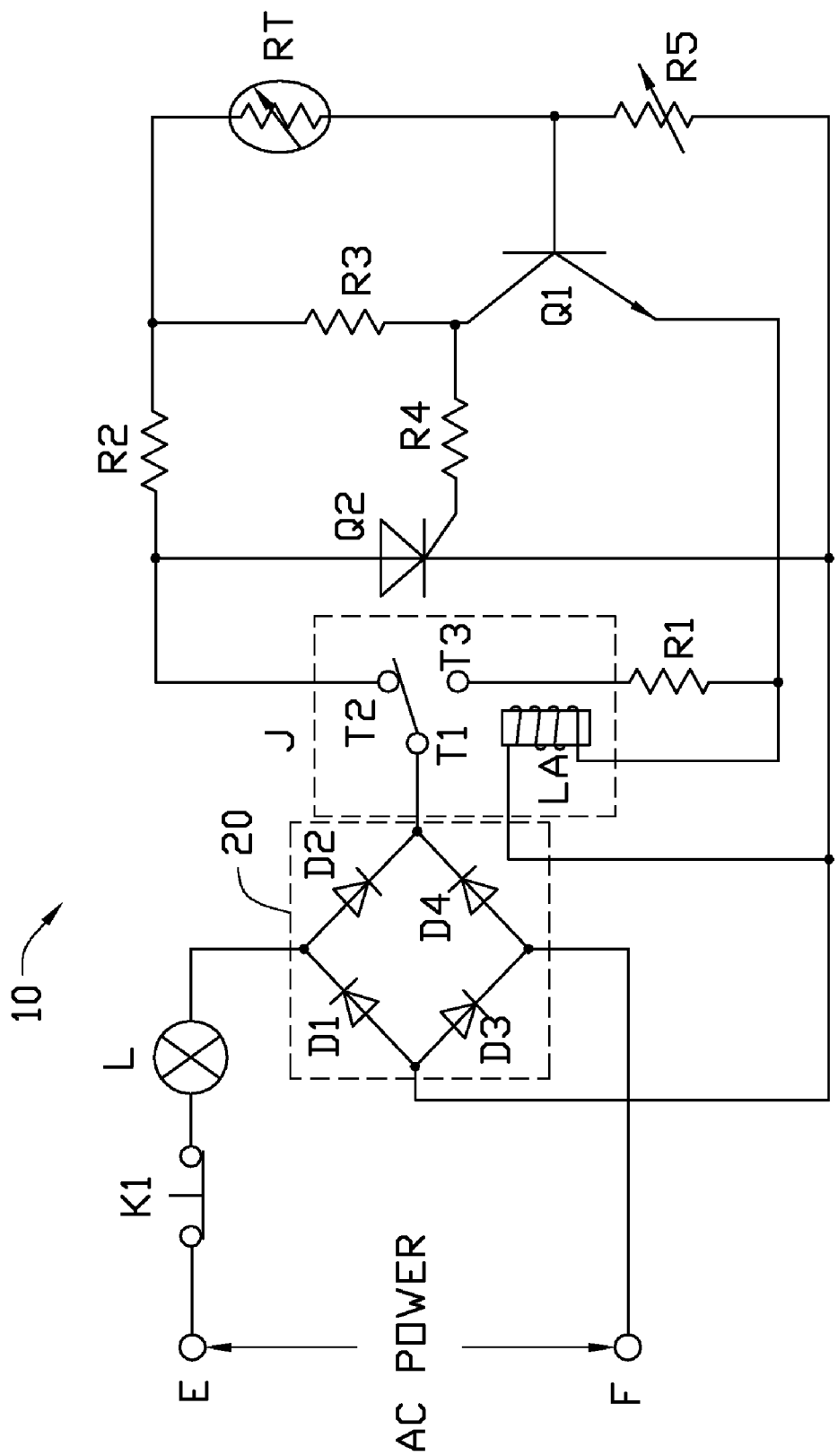

LIGHTING DELAY CIRCUIT

BACKGROUND

1. Technical Field

The present disclosure relates to a circuit for controlling a light with a timer to automatically turn off after a set time.

2. Description of Related Art

To save power, in some places, such as corridor or stairway, a light needs to be turned on by a person passing through the corridor, and then needs to be turned off after the person passes.

Despite the fact that sound control circuits may achieve this purpose, sound control circuits are not fit for noisy environments, such as an outdoor corridor or stairway.

BRIEF DESCRIPTION OF THE DRAWING

The drawing is a circuit diagram of an exemplary embodiment of lighting delay circuit.

DETAILED DESCRIPTION

Referring to the drawing, an exemplary embodiment of a lighting delay circuit 10 includes a switch K1, a commutating circuit 20, a light L, a silicon controlled rectifier (SCR) Q2, an npn transistor Q1, a relay J, four resistors R1-R4, a potentiometer R5, and a negative temperature coefficient (NTC) thermistor RT.

In one embodiment, the switch K1 is a closed switch having first and second terminals, and will be opened when it is pressed. The relay J is a type of electromagnetic relay, which includes a coil LA and single-pole double-throw (SPDT) switch, the SPDT switch includes a first contact T1, a second contact T2, and a third contact T3. The commutating circuit 20 includes four diodes D1-D4. The resistance of the NTC thermistor RT is larger than the largest resistance of the potentiometer R5, within a normal temperature, such as 25. The NTC thermistor RT is mounted adjacent to the light L.

The first terminal of the switch K1 is connected to a hot lead E of an alternating current (AC) power. The second terminal of the switch K1 is connected to a node between a cathode of the diode D1 and an anode of the diode D2 via the light L, functioning as a first terminal of the commutating circuit 20. A neutral lead F of the AC power is connected to a node between a cathode of the diode D3 and an anode of diode D4, functioning as a second terminal of the commutating circuit 10. The first contact T1 of the SPDT switch of the relay J is connected to a node between cathodes of the diodes D2 and D4, functioning as a first terminal of the commutating circuit 10. The second contact T2 of the SPDT switch of the relay J is connected to an anode of the SCR Q2, and connected to the base of the transistor Q1 through the resistor R2 and the thermistor RT in series. The third contact T3 of the SPDT switch of the relay J is connected to the emitter of the transistor Q1 through the resistor R1. The collector of the transistor Q1 is connected to a node between the resistor R2 and the thermistor RT via the resistor R3. The collector of the transistor Q1 is also connected to a gate of the SCR Q2 via the resistor R4. The base of transistor Q1 is connected to a cathode of the SCR Q2 and the node between anodes of the diodes D1 and D3 functioning as a second terminal of the commutating circuit 20, via the potentiometer R5. The first contact T1 is connected to the third contact T3 in the presence of a current through the coil LA of the relay J. The first contact T1 is connected to the second contact T2 in the absence of the current through the coil LA of the relay J.

In use, the lighting delay circuit 10 is installed, for instance, in a corridor, with the thermistor RT arranged adjacent to the light L. The switch K1 may be set on a wall bounding the corridor or a pillar in the corridor. In an original state, the switch K1 is closed, the first contact T1 is connected to the third contact T3 of the SPDT switch of the relay J. A current is flowing through the light L and the coil LA, but it is too small to turn on the light L, and can make the first contact T1 connect to the third contact T3 of the SPDT switch of the relay J.

When a person enters the corridor, the person presses the switch K1, the first and second terminals of the switch K1 are disconnected to open the switch K1. Therefore, there is no current flowing through the coil LA, and the first contact T1 is connected to the second contact T2 of the SPDT switch of the relay J. The switch K1 is then released to be closed. The resistance of the thermistor RT is much larger than the resistance of the potentiometer R5, the base of the transistor Q1 is at a low voltage level, thereby the transistor Q1 is turned off. There is still no current flowing through the coil LA of the relay J, and the first contact T1 of the relay J remains to be connected to the second contact T2 of the relay J. The collector of the transistor Q1 and the gate of the SCR Q2 are at high voltage level. The anode of the SCR Q2 is at a high voltage level, while the cathode of the SCR Q2 is at a low voltage level, so the SCR Q2 is turned on.

A current will then flow through the switch K1, the light L, the commutating circuit 10, first and second contacts T1 and T2 of the relay J, anode-cathode of the SCR Q2, and the commutating circuit 10. Thereby, the current is strong enough to turn on the light L and keep the light L working normally for a preset time period that is long enough for a person to pass through the corridor. In the preset time period, the temperature around the light L slowly rises. The resistance of the thermistor RT decreases along with the rise of the temperature, making the voltage at the base of the transistor Q1 increase. When the voltage at the base of the transistor Q1 exceeds the threshold value of the transistor Q1, the transistor Q1 is turned on. The voltage of the collector of the transistor Q1 is at a lower level, therefore, a current flows through the coil LA of the relay J, the first contact T1 of the relay J is connected to the third contact T3, again. Thereby, current flows through the switch K1, the light L, the commutating circuit 10, the resistor R1, the coil LA, and the commutating circuit 10 again, the light L is turned off. Because the switch K1 keeps closed, unless it is pressed, a current remains flowing through the coil LA of the relay J, and the first contact T1 keeps connecting to the third contact T3. Hence, the lighting delay circuit is ready to rerun again, whenever the switch K1 is pressed to turn on the light L.

The preset time period may be increased by replacing the thermistor R5 with another thermistor that has a larger absolute value of temperature coefficient than the thermistor R5, or by adjusting the resistance of the potentiometer R5.

In other embodiments, the transistor Q1 may also be replaced by another type of electronic switch, such as a metal-oxide-semiconductor field-effect transistor.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A lighting delay circuit, comprising:
   a switch comprising a first terminal to be coupled to a hot lead of an alternating current (AC) power and a second terminal;
   a light;
   a commutating circuit comprising a first terminal connected to the second terminal of the switch via the light, a second terminal to be coupled to a neutral lead of the AC power, a third terminal, and a fourth terminal;
   a relay comprising a single-pole double-throw (SPDT) switch and a coil, the SPDT switch comprising a first contact coupled to the third terminal of the commutating circuit, a second contact, and a third contact connected to the fourth terminal of the commutating circuit through a first resistor and the coil in series, wherein the first contact is connected to the third contact in the presence of a current flowing through the coil, the first contact is connected to the second contact when there is no current flowing through the coil;
   a switching element comprising an anode connected to the second contact of the SPDT switch, a cathode connected to the fourth terminal of the commutating circuit, and a gate, wherein the switching element turns the light on when the first contact is connected to the second contact of the SPDT switch of the relay;
   a negative temperature coefficient thermistor comprising a first terminal connected to the second contact of the SPDT switch via a second resistor, and a second terminal; and
   an electronic switch comprising a first terminal, a second terminal, and a third terminal, wherein the first terminal of the electronic switch is connected to the second terminal of the thermistor, and connected to the cathode of the switching element via a third resistor; the second terminal of the electronic switch is connected to a node between the thermistor and the second resistor, and connected to the gate of the switching element; and the third terminal of the electronic switch is connected to a node between the coil and the first resistor;
   wherein the thermistor is arranged adjacent to the light to sense temperature around the light for turning off the electronic switch when the temperature exceeds a threshold value of the electronic switch, so as to make the first contact connect to the third contact of the relay to turn off the light.

2. The lighting delay circuit of claim 1, wherein the commutating circuit comprises first to fourth diodes, a node between a cathode of the first diode and an anode of the second diode functions as the first terminal of the commutating circuit, a node between a cathode of the fourth diode and an anode of the third diode functions as the second terminal of the commutating circuit, a node between cathodes of the second and fourth diodes functions as the third terminal of the commutating circuit, a node between anodes of the first and third diodes functions as the fourth terminal of the commutating circuit.

3. The lighting delay circuit of claim 1, wherein the switching element is a silicon controlled rectifier.

4. The lighting delay circuit of claim 1, wherein the electronic switch is an npn transistor comprising a base, a collector, and an emitter respectively function as the first, the second, and the third terminals of the electronic switch.

5. The lighting delay circuit of claim 1, wherein the second terminal of the electronic switch is connected to the node between the second resistor and the thermistor via a fourth resistor.

6. The lighting delay circuit of claim 1, wherein the second terminal of the electronic switch is connected to the gate of the switching element via a fourth resistor.

7. The lighting delay circuit of claim 1, wherein the third resistor is a potentiometer.

* * * * *